Feb. 13, 1934.  G. S. ROWELL  1,946,810
SHEET HOLDING FRAME FOR PHOTOGRAPHIC USE
Filed Aug. 26, 1931   2 Sheets-Sheet 1
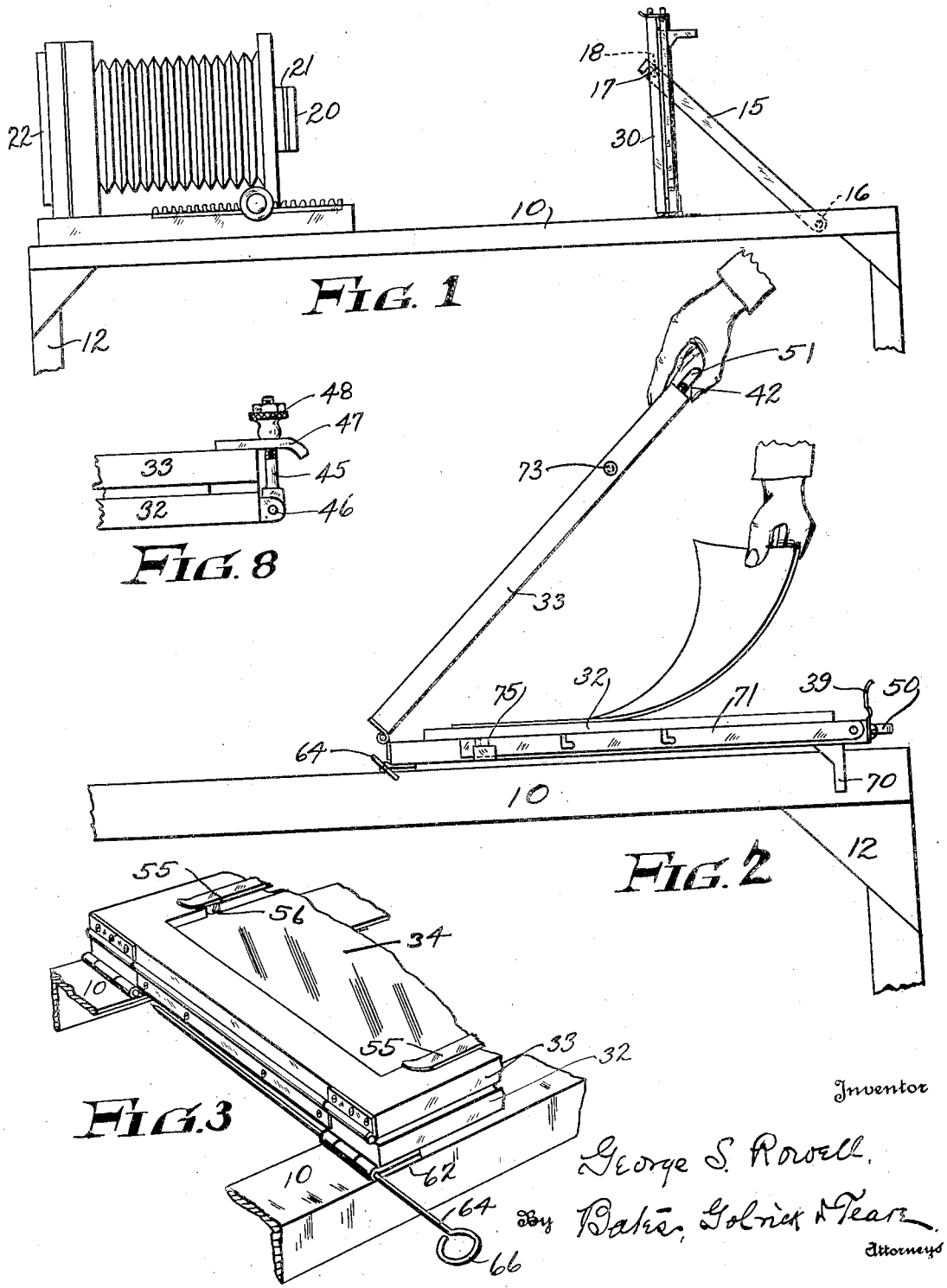

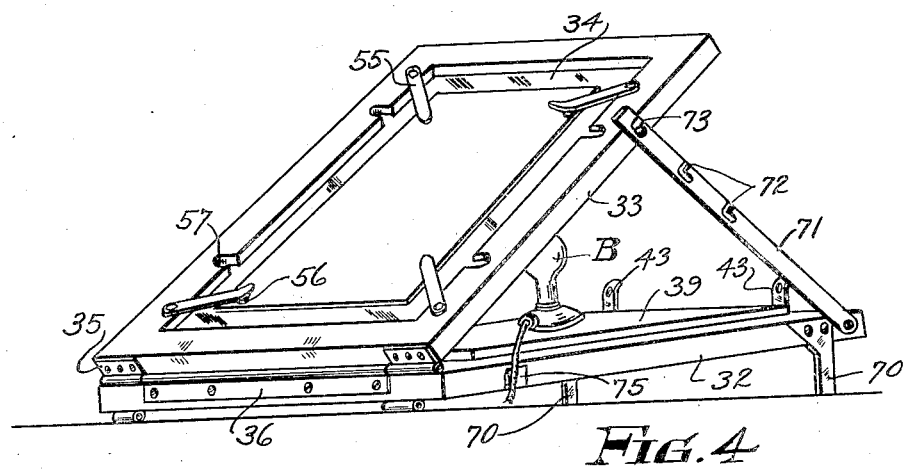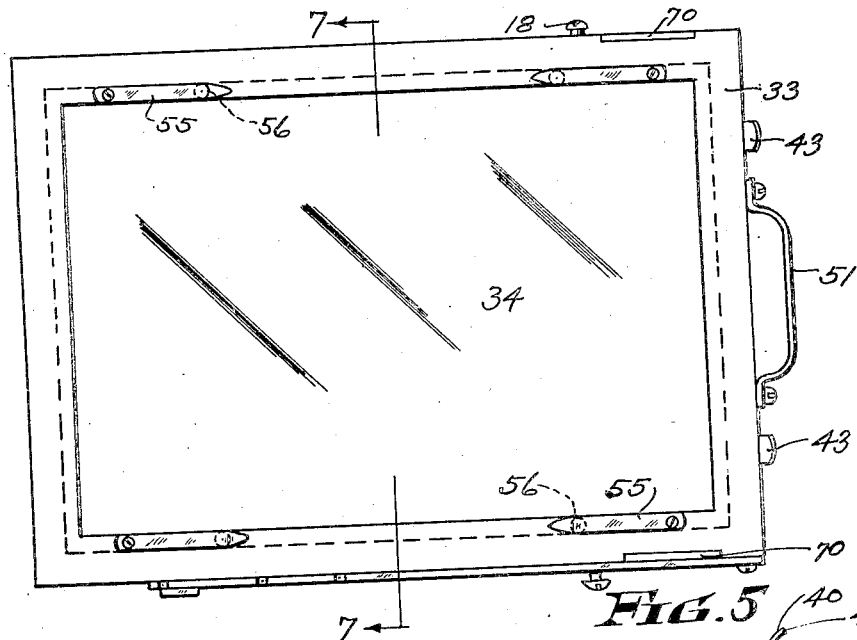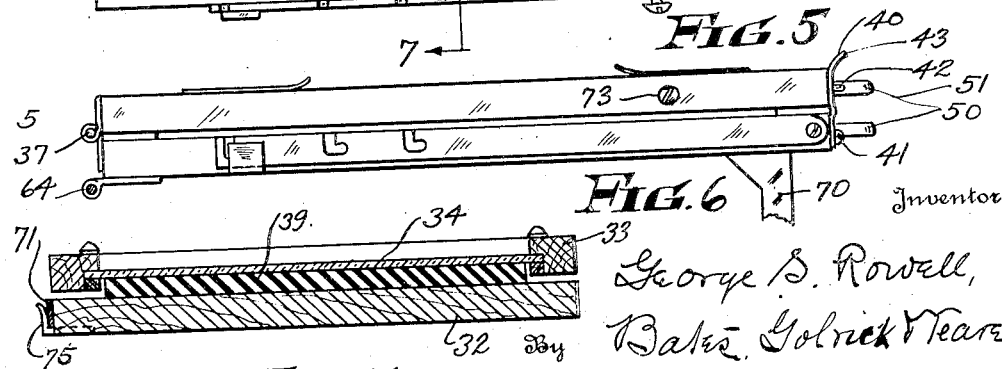

Patented Feb. 13, 1934

1,946,810

UNITED STATES PATENT OFFICE 1,946,810

SHEET HOLDING FRAME FOR PHOTOGRAPHIC USE

George S. Rowell, Cleveland, Ohio, assignor to Multigraph Company, Wilmington, Del., a corporation of Delaware Application August 26, 1931. Serial No. 559,515

6 Claims. (Cl. 88—24)

This invention relates to a photographic printing frame adapted for a variety of operations attendant upon photography. Thus, my frame may be employed to support an original or text at proper focal distance from a camera; or carry a sensitized surface for projected light rays, or, in contact with a negative, for contact printing; or the frame may be used for enabling the convenient retouching of a negative or plate. My frame finds its greatest use in connection with photolithography, and furnishes a universal apparatus within its range of size, designed to take care of the various conditions of exposing, retouching and printing, which are present in a photolithographic operation.

To the above end, I provide a frame comprising a pair of mutually hinged members, one having a glass plate and the other a suitable backing, so that an original to be photographed, or a sensitized member and a negative, if desired, may be clamped between the two members; I arrange for mounting the complete device as a unit in proper relation to a camera or projector, and I provide for the ready removal of such unit and for clamping a negative on the face of the glass plate and holding the glass-plate-frame at an angle to the other frame to enable it to be readily used as a retouching device.

The invention is illustrated in the drawings hereof, which shows a preferred embodiment, and is hereinafter more fully described and the novel characteristics are summarized in the claims.

In the drawings, Fig. 1 is a side elevation showing my printing frame in position for holding a print, or other original, to be photographed by a camera or for holding a sensitized plate in proper relation to a projector; Fig. 2 is a view of my frame, as a sensitized metal plate is being placed therein for projected exposure, or for light contact printing through a negative, not shown; Fig. 3 is a perspective illustrating the hinging of the complete frame to a support; Fig. 4 is a perspective of the complete frame removed from its support and used as a retouching device; Fig. 5 is a plan of the frame; Fig. 6 is an edge view of the frame when closed; Fig. 7 is a cross section through the frame, as indicated by the line 7—7 on Fig. 5; Fig. 8 is the detail illustrating, in modified form, the clamp for locking the frame members together.

As shown in Fig. 1, 10 indicates a suitable horizontal support or table, which may readily be made of a pair of angle bars 11, as shown in Fig. 3, suitably cross braced and supported on legs 12; 20 designates a camera or projector carried by this table. This may be an ordinary camera for taking a picture having a lens at 21 and means for carrying a sensitized plate at 22, or it may be a projector adapted to throw rays of light from behind the negative, through it and the lens.

My frame, designated 30 as a unit, shown in Fig. 1, is mounted on the table 10 and held in upright position by a brace 15 secured to the table and frame. In this position, my frame may carry the original copy to be photographed in the camera 20, or may carry a sensitized plate to receive light rays from the member 20 acting as a projector.

My frame 30 comprises suitable base 32, which may be a solid rectangular plate, and a suitable border member 33 carrying a glass plate 34 and permanently hinged to the base member at one edge, which is the lower edge of these members when they are vertical. The hinge is clearly shown in Figs. 3 and 4, and, as there shown, comprises two extreme hinge leaves 35 secured to the surmounting border member 33 and an intermediate hinge leaf 36 secured to the edge of the base member 32 and a long hinge pintle 37 connecting these leaves. The base frame carries on its face a suitable elastic pad which may be a sheet of rubber 39.

Suitable means is provided at the upper edges of the two members of the frame for locking them together. This may consist of a pair of leaf springs 40 secured at 41 to the base member and having openings adapted to receive pins 42 projected from the surmounting member. The upper edges of the leaf springs are curved back, as shown at 43, and, accordingly, when the member is being closed, the pins 42 engage such curved edges and cam the leaves away from the surmounting frame, enabling the pins 42 to pass into the openings of the leaves, after which the latter spring back into the position shown in Fig. 6.

In place of the clamping means described, I may use the construction shown in Fig. 8, where bolts 45 are pivoted to ears 46 on the base frame 32 and are adapted to be swung into bifurcated clips 47 carried by the surmounting member 33. Suitable nuts 48 on the bolts furnish means for tightening them in place.

Whichever form of locking device is employed, there are preferably two of such locks near the corners of the frame, and between these locks are suitable handles or bails 50 and 51 by which the frame members may be manipulated and the whole device readily carried from place to place.

The original sheet to be photographed is ordinarily clamped within the frame between the elastic cushion and the glass plate, but where sufficiently stiff, it may be carried on the outer face of the glass plate. To enable the surmounting member 33 to readily carry on its outer face the image for copying, or a negative, for retouching, I provide such outer face with a set of spring fingers 55, which are pivoted to the frame tightly enough to hold them in any given position, while allowing them to be swung on their pivots, as desired. The underside of each finger is a cushion or pad 56. The frame is provided with suitable recesses 57 adapted to receive these pads when the fingers are in idle position, as shown in Fig. 5.

When a sheet is to be mounted on the outside of the frame for exposure or retouching, it is placed against the glass plate 34, and each of the spring fingers 55 is swung inwardly from the border to overlap the edge of such sheet, as indicated by the sheet A in Fig. 4. The spring fingers are curved upwardly slightly at their free ends to enable the operator to lift them readily entirely beyond the plane of the sheet A, so that while they are being swung into position they will not mar the border of that sheet. After being brought into their inward position, as shown in Fig. 4, and released, their resilience causes their pads 56 to bear against the sheet to hold it in place.

The combined frame described is removably hinged to the table 10. To that end, I provide hinge leaves 60 permanently secured to the top of the table and cooperating hinge leaves 62 secured to the underside of the base member 33 of the frame and a long, removable pintle 64, which, preferably, is pointed at one end as shown at 65, and has an eye 66 at the other end. When this pintle is in place, the frame is hinged as a unit to the table. It may lie in a horizontal position thereon for placing a sheet therein or for locating the copy on top thereof, or it may be swung up as a unit into the vertical position as shown in Fig. 1. In this latter position, it is held by the brace 15, heretofore referred to, which is preferably a bar permanently pivoted to the table at 16 and having a downwardly facing notch 17 adapted to engage the pin 18 (Fig. 5) projecting from one edge of the frame.

It will be seen that in the construction described, the frame may be utilized as a unitary part of the apparatus comprising the table, camera and frame, and may thus insure the copy to be photographed on the sensitized member to receive the rays of light being held at a known distance from the camera, and in a position at right angles to the lens axis. A simple release of the bar 15 from the pin 18 enables the frame to be folded down into a horizontal position. In this position the copy to be photographed may be readily mounted on top of the glass plate 34, or, if desired, the frame may be swung open for mounting a sheet or sheets between its members, as illustrated in Fig. 2.

My frame is also utilizable in retouching of a negative or a sensitized plate which has been exposed and developed. The removal of the hinge pintle 64 enables the entire frame to be carried as a unit by its handles 50 and 51 to any place desired. The base member of the frame carries a pair of legs 70 which may support it in a slightly inclined position, as shown in Fig. 4, and this base member also has pivoted to it a brace 71 which has a number of L-shaped notches 72, any one of which is adapted to coact with a pin 73 on the side of the surmounting frame 33. This enables the upper frame to be held at any desired angle with reference to the lower frame. The frame thus furnishes very convenient means for retouching.

As illustrated in Fig. 4, the sheet A may be a translucent negative held on the glass plate, and, in retouching it, it is only necessary to place an electric light—indicated at B—between the frames to illuminate this negative; or, if the member A is a metal plate being retouched, it can be illuminated from a light above, not shown. When the frame is mounted on the table 10, the brace bar 71 is held in idle position alongside of the base 32, the extreme end being retained by a suitable clip 75 secured to such base. When mounted in this manner, the legs 70 straddle the table, lying beside it, as shown in Fig. 2, and thus form braces, preventing any skewing strain being inadvertently thrown on the hinge connecting the frame to the table.

It will be seen that, from the description given, I have provided a frame adapted for practically universal use in connection with forming photolithographic plates. The frame may carry the copy in accurate position to be photographed; it may carry a sensitized sheet in accurate position to receive rays from a projector; it may readily clamp a negative over a sensitized plate for light printing of the latter, and it may be conveniently used as a retouching frame either for translucent negatives or opaque plates.

I claim:

1. The combination of a base member, a surmounting member having a glass plate and hinged to the base member, means for removably hinging such frame to a support, means for holding the frame at substantially right angles to the support, and means for holding one member of the frame at various acute angles to the other member.

2. In a printing frame, comprising a base member and a top member carrying a glass plate, said members being hinged together, means for clamping the members together at their free ends, means for holding a plate on the outer face of the glass, and a brace adapted to extend from one member to the other member and hold the two members at an acute angle to each other.

3. A printing frame, comprising a base member, a resilient pad secured thereon, a border member hinged at one end of the base member, a glass plate carried by the border member, a set of fingers carried by the border member and adapted to be swung over a sheet on the outside of the glass plate, means for locking the base member and border member together at the end opposite the hinge, and means adapted to hold the border member at different acute angles with reference to the base member.

4. In a photographic apparatus the combination of a base member, a top member, a translucent plate carried by the top member, the two members being hinged together at one end, one of the members having a pair of arms hinged thereto at opposite edges and the other member having edge projections which said arms may variably engage, and means for holding a sheet on the outer face of said translucent plate.

5. A camera support and a frame, said frame comprising a base member and a top member, a hinge connecting the frame members together at one end, a second hinge adjacent the first hinge parallel therewith and adapted to connect the frame removably to the support, means for bracing the top member inclined toward the bottom member at an acute angle about the first hinge, and means for bracing the frame on the support in a vertical position about the second hinge.

6. In a photographic apparatus, the combination, with a table, of a frame removably hinged thereto and comprising a base member, a top member, a translucent plate carried by the top member, the two members being hinged together at one end adjacent the frame hinge to the table, the base member having a pair of arms hinged thereto at opposite edges and adapted to coact with projections on the top member, a pair of arms hinged to the table and adapted to coact with projections on the frame, whereby in one position the frame is held vertically by the table arms coacting with the projections on the frame, and in another position the frame members are held at an acute angle to each other by the frame arms coacting with the projections on the frame.

GEORGE S. ROWELL.